United States Patent
Jung et al.

(10) Patent No.: US 10,397,832 B2
(45) Date of Patent: Aug. 27, 2019

(54) SOURCE ID-BASED PACKET FILTERING METHOD IN WIRELESS COMMUNICATION SYSTEM AND TERMINAL USING METHOD

(71) Applicant: LG Electronics Inc., Seoul (KR)

(72) Inventors: Sunghoon Jung, Seoul (KR); Jaewook Lee, Seoul (KR); Youngdae Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/563,683

(22) PCT Filed: Apr. 4, 2016

(86) PCT No.: PCT/KR2016/003468
§ 371 (c)(1),
(2) Date: Oct. 2, 2017

(87) PCT Pub. No.: WO2016/159742
PCT Pub. Date: Oct. 6, 2016

(65) Prior Publication Data
US 2018/0077608 A1  Mar. 15, 2018

Related U.S. Application Data

(60) Provisional application No. 62/143,223, filed on Apr. 6, 2015, provisional application No. 62/142,497, filed on Apr. 3, 2015.

(51) Int. Cl.
*H04W 28/10* (2009.01)
*H04W 28/02* (2009.01)
(Continued)

(52) U.S. Cl.
CPC .......... *H04W 28/10* (2013.01); *H04W 28/02* (2013.01); *H04W 76/14* (2018.02); *H04W 88/04* (2013.01); *H04L 47/20* (2013.01); *H04L 47/30* (2013.01)

(58) Field of Classification Search
CPC .......... H04W 72/02–042; H04W 74/002–006; H04W 74/04; H04W 76/14; H04W 76/23; H04W 88/04
See application file for complete search history.

(56) References Cited

U.S. PATENT DOCUMENTS

2010/0120397 A1   5/2010   Kazmi et al.
2014/0328329 A1   11/2014  Novlan et al.
(Continued)

FOREIGN PATENT DOCUMENTS

WO   2014/117854 A1   8/2014

OTHER PUBLICATIONS

International Search Report issued in corresponding International Patent Application No. PCT/KR2016/003468 dated Jul. 12, 2016.
(Continued)

*Primary Examiner* — Pao Sinkantarakorn
(74) *Attorney, Agent, or Firm* — Morgan, Lewis & Bockius LLP

(57) ABSTRACT

The present invention provides a device-to-device (D2D) operation method performed by a relay terminal in a wireless communication system, the D2D operation method receiving data from a remote terminal, wherein the data includes a source ID of the data, filtering a packet of the data, and relaying the filtered data to a network, wherein the data is filtered on the basis of the source ID of the data.

11 Claims, 17 Drawing Sheets

(51) Int. Cl.
*H04W 88/04* (2009.01)
*H04W 76/14* (2018.01)
*H04L 12/813* (2013.01)
*H04L 12/835* (2013.01)

(56) References Cited

U.S. PATENT DOCUMENTS

2015/0056987 A1      2/2015  Li et al.
2015/0078301 A1      3/2015  Toth et al.
2016/0157254 A1*     6/2016  Novlan ................ H04W 76/14
                                                370/329
2017/0085573 A1*     3/2017  Zhang .................. H04W 76/14

OTHER PUBLICATIONS

3GPP TS 36304 V85.0 (Mar. 2009), 3rd Generation Partnership Project; Technical Specification Group Radio Access network; Evolved Universal Terrestrial Radio Access (E-UTRA); User Equipment (UE) procedures in idle mode (Release 8).

* cited by examiner

SOURCE ID-BASED PACKET FILTERING METHOD IN WIRELESS COMMUNICATION SYSTEM AND TERMINAL USING METHOD

CROSS-REFERENCE TO RELATED APPLICATIONS

This application is the National Stage filing under 35 U.S.C. 371 of International Application No. PCT/KR2016/003468, filed on Apr. 4, 2016, which claims the benefit of U.S. Provisional Applications No. 62/142,497 filed on Apr. 3, 2015, and No. 62/143,223 filed on Apr. 6, 2015, the contents of which are all hereby incorporated by reference herein in their entirety.

BACKGROUND OF THE INVENTION

Field of the Invention

The present invention is related to wireless communication and more specifically, a D2D operation method performed by a terminal in a wireless communication system and a terminal using the method.

Related Art

ITU-R (International Telecommunication Union Radio communication sector) is developing IMT (International Mobile Telecommunication)-Advanced standards, the next generation mobile communication system following the 3rd-generation system. The IMT-Advanced aims to support IP (Internet Protocol)-based multimedia services at data rates of 1 Gbps in a stationary and low speed state and 100 Mbps in a high speed state.

The 3GPP (3rd Generation Partnership Project) is preparing for the LTE-Advanced (LTE-A), which is an update of the LTE (Long Term Evolution) based on the OFDMA (Orthogonal Frequency Division Multiple Access)/SC-FDMA (Single Carrier-Frequency Division Multiple Access) transmission scheme, as the system standard satisfying requirements of the IMT-Advanced. The LTE-A is one of promising candidates for the IMT-Advanced.

Recently, there is a growing interest in the D2D (Device-to-Device) technology for direct communication between devices. In particular, D2D is getting attention as a communication technology for public safety networks. Although commercial communication networks are rapidly changing to the LTE system, current public safety networks mostly rely on the 2G technology because of issues of backward compatibility with existing communication standards and cost issues. These technology gaps and the needs for improved services lead to the efforts for improving the public safety networks.

Service requirements of public safety networks are more demanding (in terms of reliability and security) than commercial communication networks and also include direct signal transmission and reception between devices, namely D2D operation even when the devices are out of coverage of cellular communication or cellular communication is unavailable for them.

D2D operation has various advantages in terms of signal transmission and reception between devices in the vicinity of each other. For example, D2D terminals may perform data communication with a high data rate and low latency. Also, D2D operation may distribute traffic concentrated on a base station, and if used as a repeater, a D2D terminal may perform the role of extending coverage of a base station.

Meanwhile, if a D2D terminal operates as a repeater, it needs to define in which way the D2D terminal operating as a repeater should perform packet filtering.

SUMMARY OF THE INVENTION

A technical object that the present invention attempts to achieve is to provide a D2D operation method performed by a terminal in a wireless communication system and to provide a terminal using the method.

In an aspect, a method for Device-to-Device (D2D) operation in a wireless communication system is provided. The method is performed by a relay UE and comprises receiving data from a remote UE, wherein the data include a source ID of the data, filtering packets of the data and relaying the filtered data, wherein the data are filtered based on a source ID of the data.

The relaying the filtered data may include relaying the filtered data to a network and further comprises establishing a relay link between the network and the remote UE, wherein the data are transmitted through the relay link.

The relay link may be a relay link providing a relay service for 1-to-many data between a relay UE and a remote UE, where M is a natural number equal to or larger than 2.

When the relay link is established, a white list may be allocated to the relay UE, the white list indicating that data are transmitted to UEs corresponding to a group ID belonging to a group list.

The filtering packets of data may comprise determining whether a source ID of the data corresponds to an ID of the remote UE, and a destination ID of the data corresponds to a group ID of the white list, and the relaying data to a network comprises relaying data the source ID of which corresponding to an ID of the remote UE and the destination ID of which corresponding to a group ID of the white list to the network.

When the relay link is established, a black list may be allocated to the relay UE, the black list indicating that data are not transmitted to UEs corresponding to a group ID belonging to a group list.

The filtering packets of data may comprise determining whether a source ID of the data corresponds to an ID of the remote UE, and a destination ID of the data corresponds to a group ID of the black list, and the relaying data to a network comprises relaying the data the source ID of which corresponding to an ID of the remote UE but the destination ID of which not corresponding to a group ID of the black list to the network.

The relay link may be a relay link providing a relay service with respect to 1:1 data between a relay UE and a remote UE.

When the relay link is established so that the relay UE relays all of data received from the remote UE, the filtering packets of data may comprise determining whether a source ID of the data received by the relay UE corresponds to an ID of the remote UE, and when a source ID of the data received by the relay UE corresponds to an ID of the remote UE, the relaying data to a network comprises relaying data received by the relay UE to the network.

When the relay link is established so that the data directed to the relay UE are relayed, the filtering packets of data may comprise determining whether a source ID of data received by the relay UE corresponds to an ID of the remote UE and a destination ID of data received by the relay UE corresponds to an ID of the relay UE; and when a source ID of data received by the relay UE corresponds to an ID of the remote UE and a destination ID of data received by the relay UE corresponds to an ID of the relay UE, the relaying data to a network comprises relaying data received by the relay UE to the network.

When the relay link is established, the network may be requested to configure a data radio bearer with respect to relaying.

When a relaying stopping condition is met, relaying the data may be stopped.

The relaying filtered data may comprise relaying the filtered data to another UE.

When the filtered data are relayed, the relay UE may transmit the filtered data and a buffer status report (BSR), and the buffer status report includes information indicating that the filtered data are relayed data.

In another aspect, a UE is provided. The UE comprises a Radio Frequency (RF) unit transmitting and receiving a radio signal, and a processor operating being connected to the RF unit, wherein the processor is configured to receive data from a remote UE, wherein the data include a source ID of the data, filter packets of the data; and relay the filtered data, wherein the data are filtered based on a source ID of the data.

The present invention provides a D2D operation method performed by a terminal in a wireless communication system and a terminal using the method.

According to the present invention, a terminal may relay data received from a different terminal and forward the received data to a network.

According to the present invention, a terminal may perform packet filtering by using a source ID of the data received from a different terminal.

According to the present invention, when a terminal relays data received from a different terminal, a source ID of the received data may be taken into account. At this time, the terminal may determine whether to perform filtering of the received data by using the source ID of the received data. If the terminal determines not to perform filtering of the received data, the terminal may forward the received data to a network. Since terminals lying outside the coverage of the network (or at the boundary of the network coverage) may also transmit data to the terminal, an effect of extending the network coverage may be obtained. Moreover, since the terminal performs packet filtering based on the source ID of the received data when the terminal forwards the received data to a network, a data region for packet filtering is reduced, and data transfer efficiency is improved over the whole network.

DESCRIPTION OF EXEMPLARY EMBODIMENTS

Figure 1:
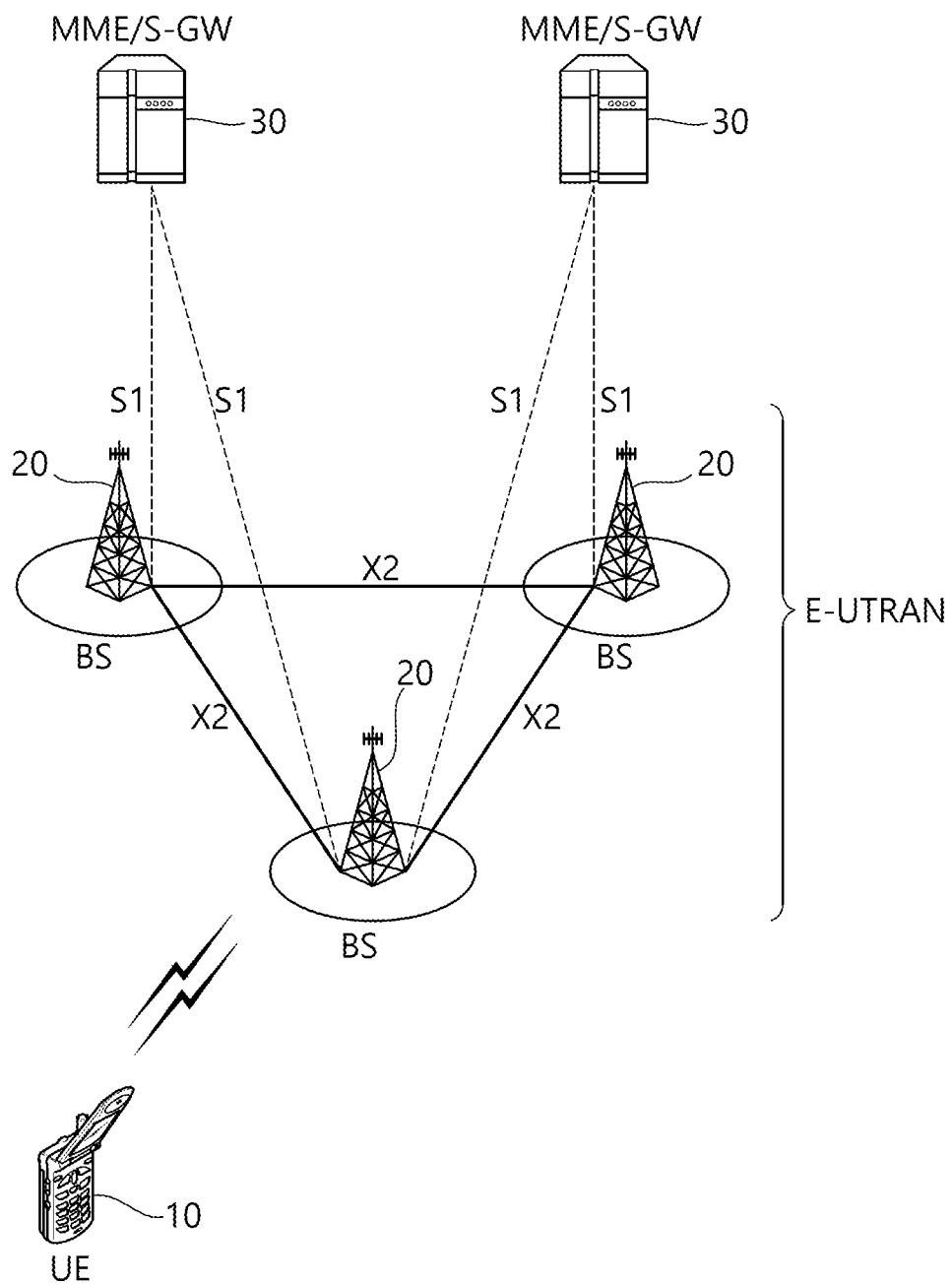
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
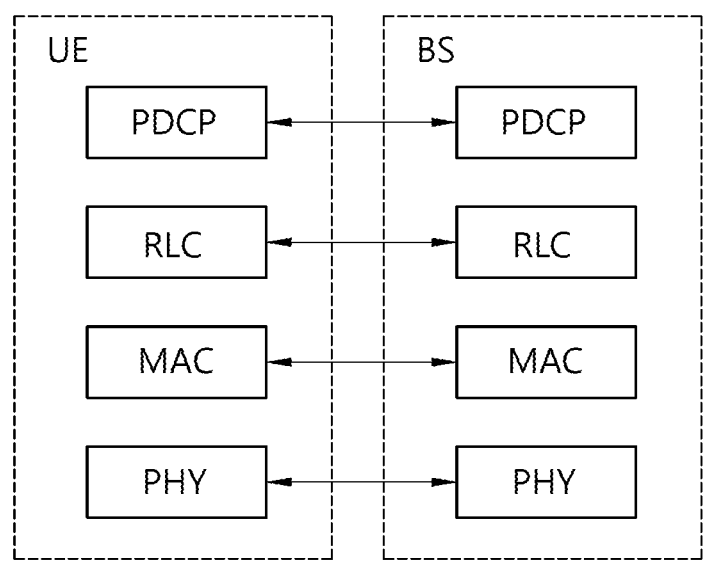
FIG. 2 is a diagram showing a wireless protocol architecture for a user plane.
Figure 3:
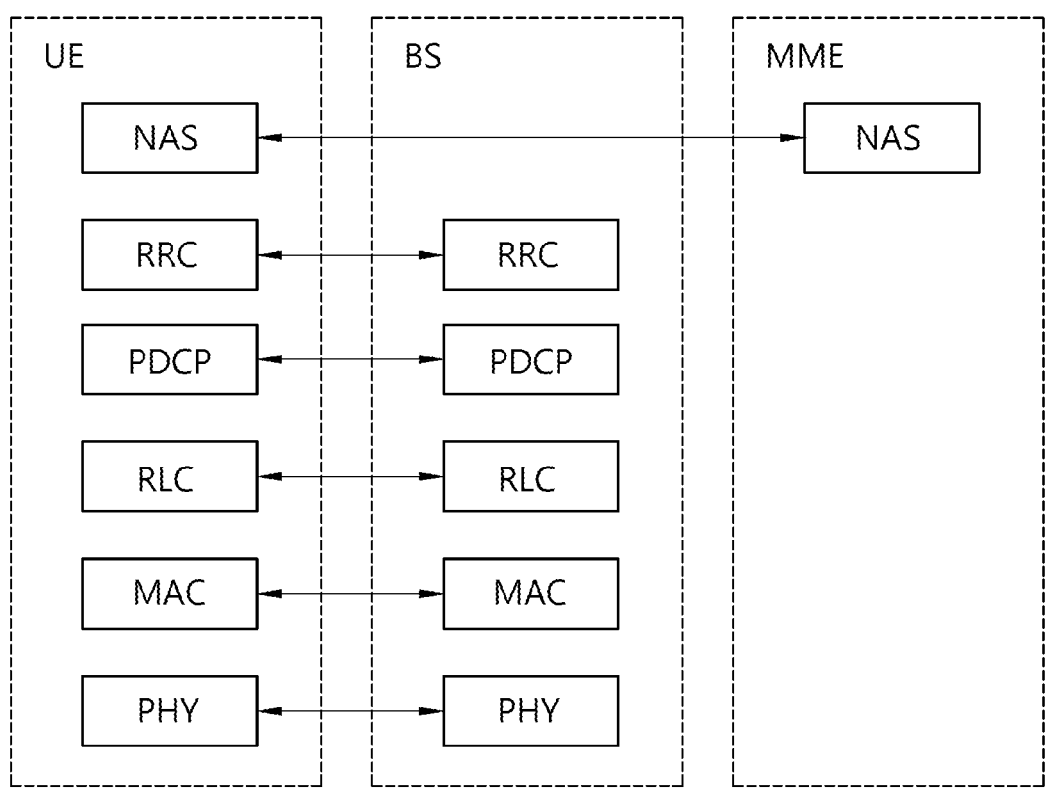
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
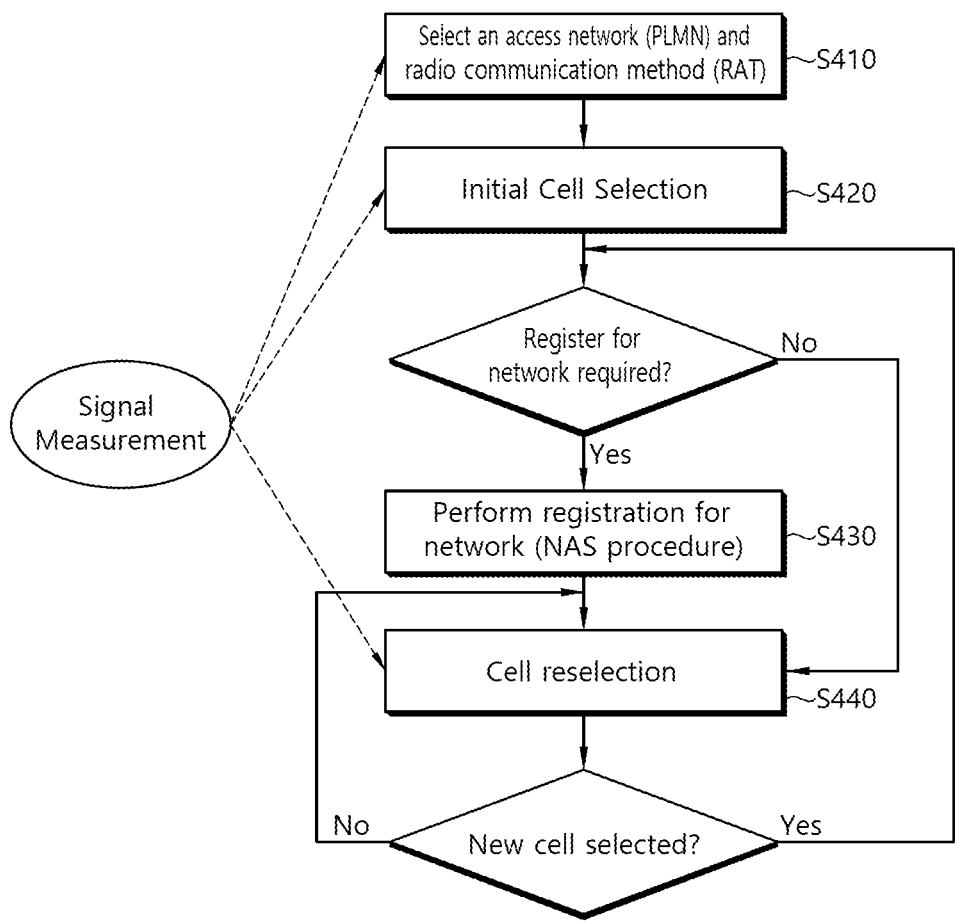
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
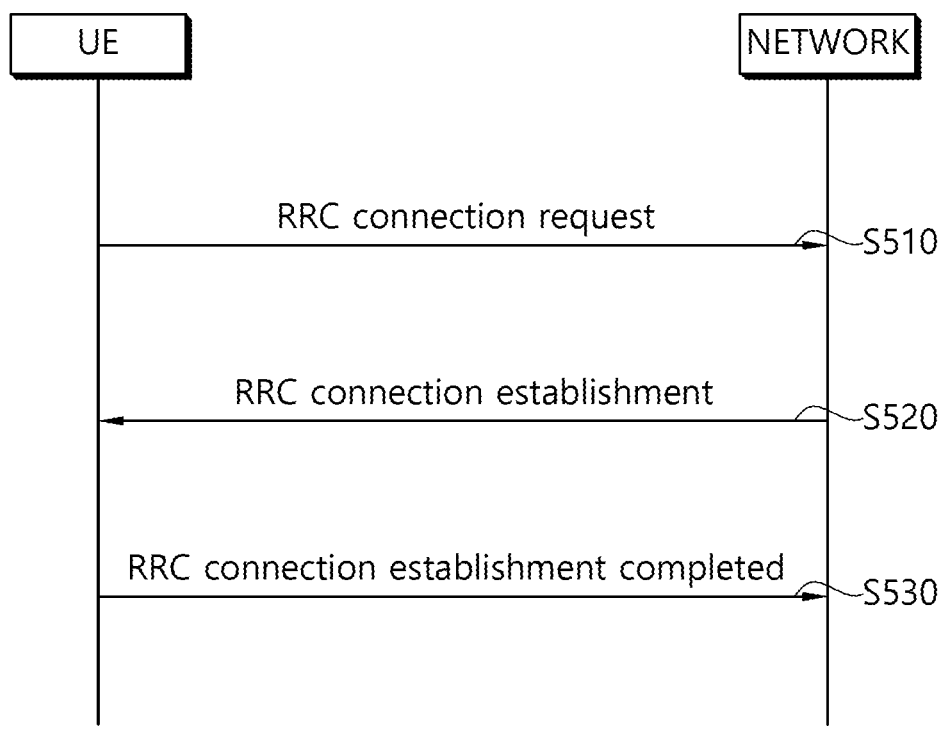
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
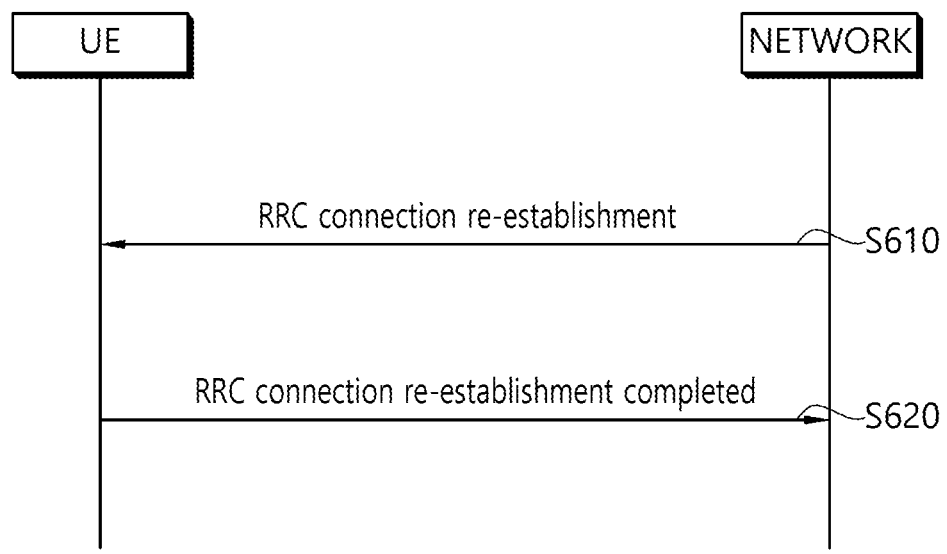
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$Srxlev > 0$ AND $Squal > 0$.

where:

$Srxlev = Q_{rxlevmeas} - (Q_{rxlevmin} + Q_{rxlevminoffset}) - P_{compensation}$, $Squal = Q_{qualmeas} - (Q_{qualmin} + Q_{qualminoffset})$ [Equation 1]

In this case, in Equation 1, the variables may be defined as in Table 1 below.

TABLE 1

| Srxlev | Cell selection RX level value (dB) |
|---|---|
| Squal | Cell selection quality value (dB) |

TABLE 1-continued

| $Q_{rxlevmeas}$ | Measured cell RX level value (RSRP) |
|---|---|
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality. After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection. The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hysts}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
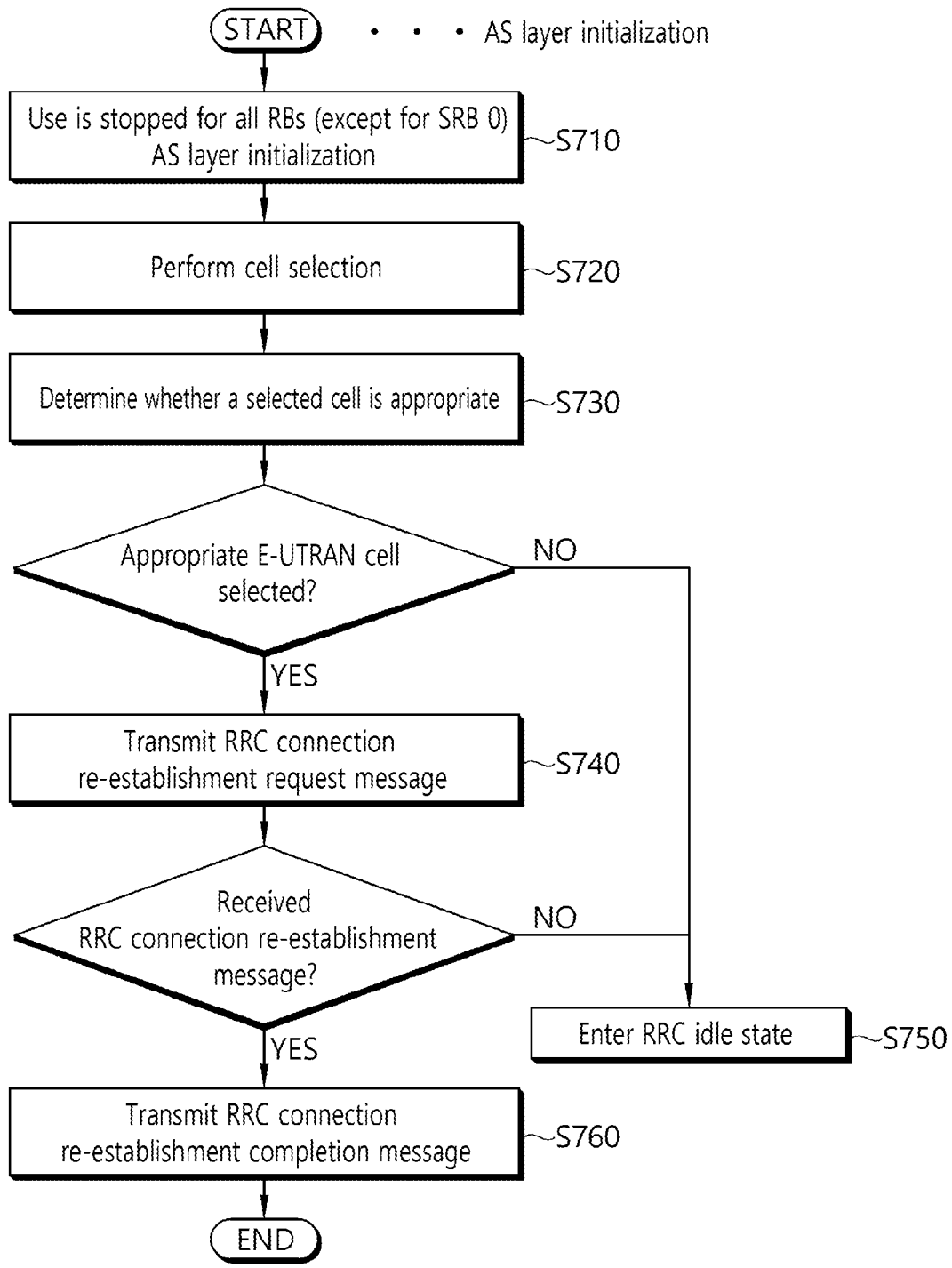
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
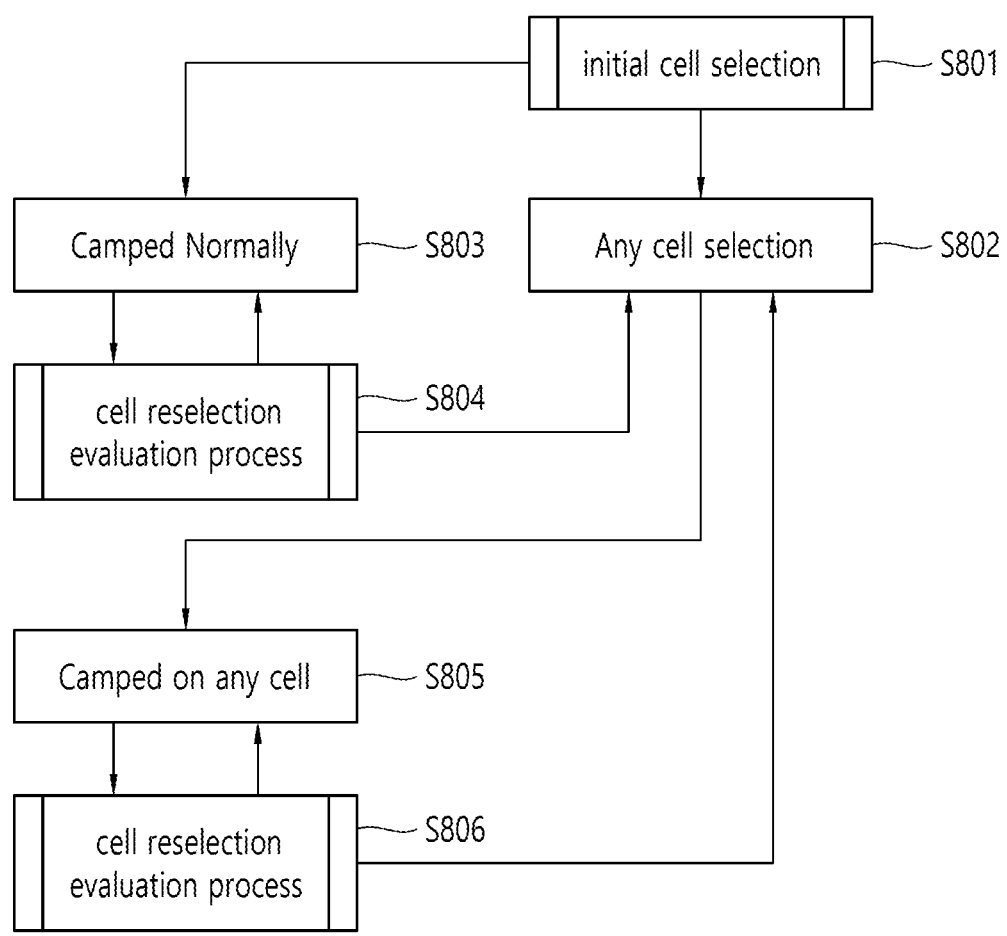
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
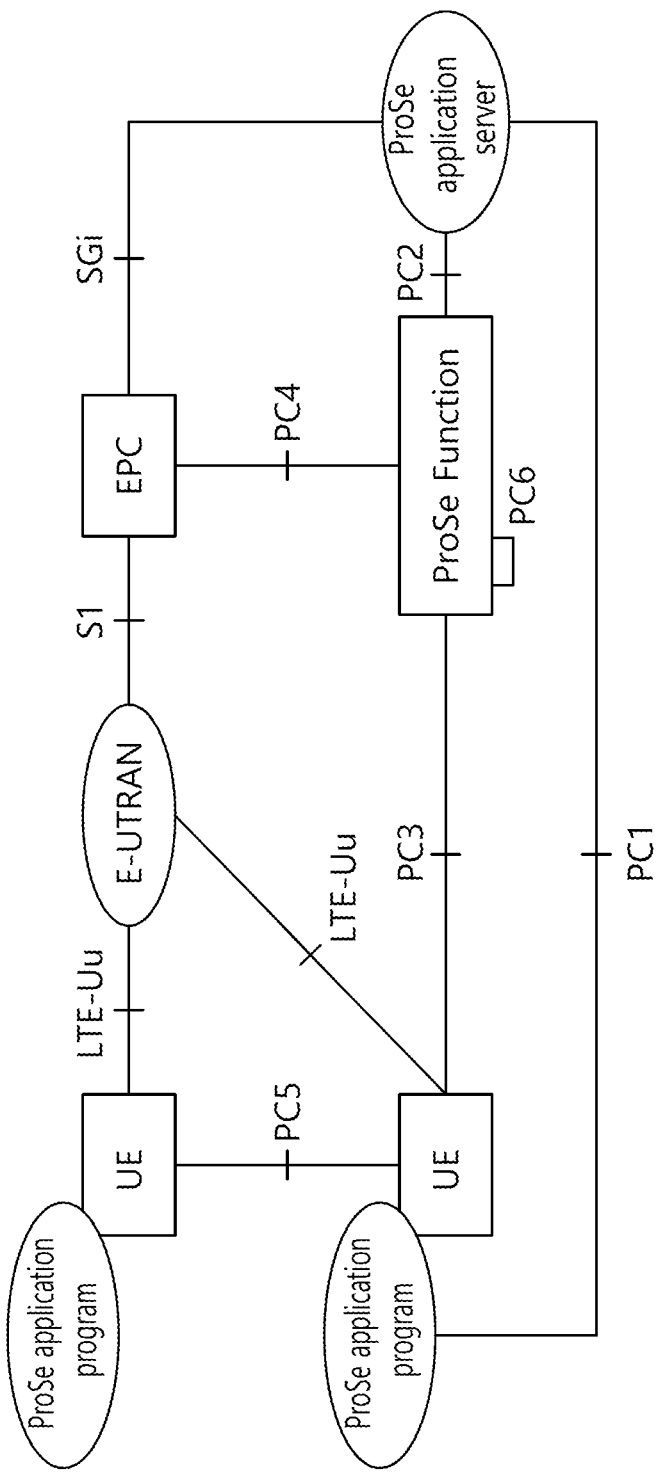
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
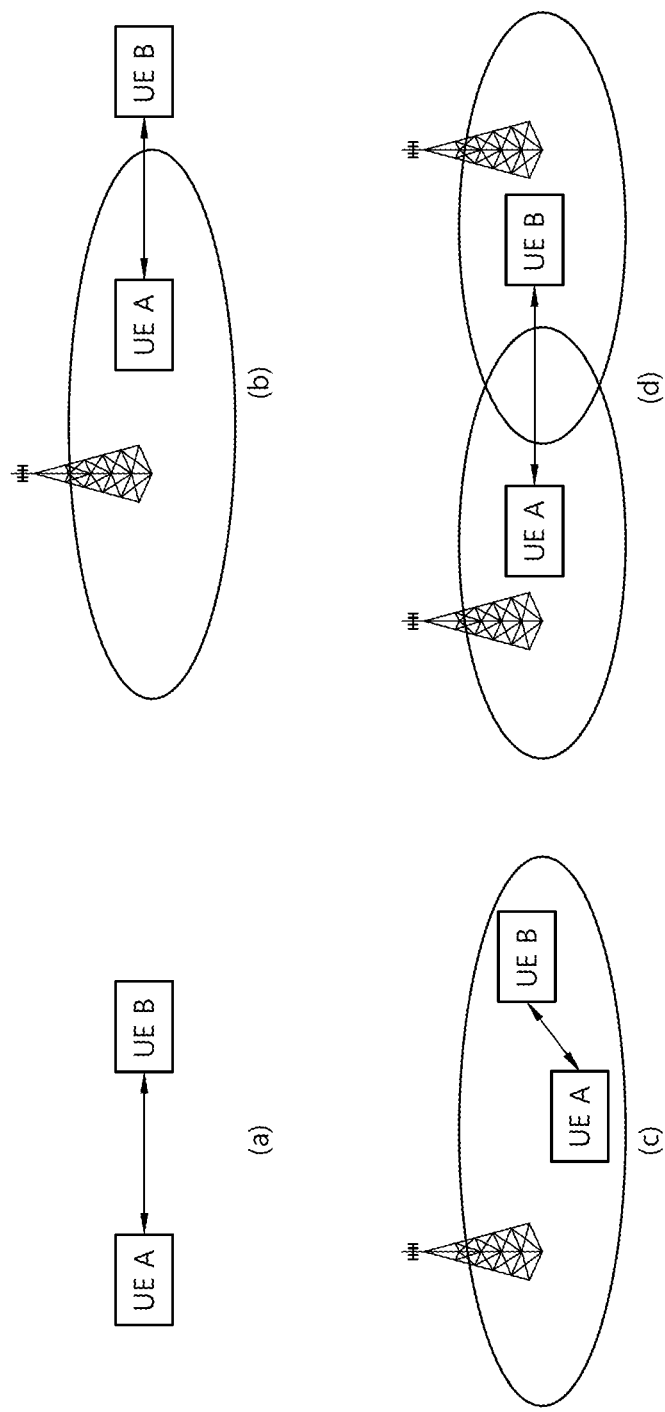
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
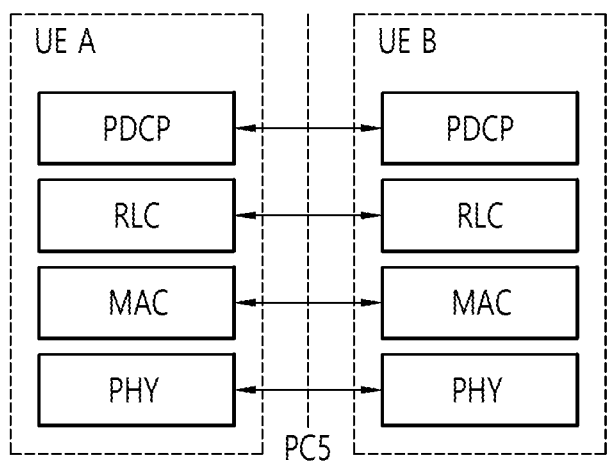
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
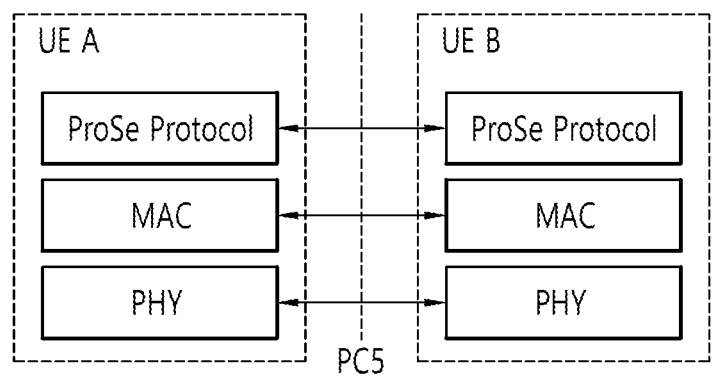
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

To extend the coverage of a cellular network, D2D communication may support a relay connecting a remote terminal to the cellular network coverage, namely a UE-to-Network Relay. For example, when a first UE performs communication with a network within the coverage of the network, and a second UE performs D2D communication with the first UE outside the network coverage (or at the boundary of the network coverage), the first UE may perform the role of a relay transferring the data of the second UE to the network. A terminal performing D2D communication is regarded as a source D2D terminal if the D2D terminal transmits data to other D2D terminals or a target D2D terminal if the D2D terminal receives data from other D2D terminals. Even when a remote terminal is located within the coverage, the UE-to-network relay service may be provided to the remote terminal to provide a better connection to a network for the remote terminal.

According to the conventional D2D operation, a receiver of D2D data may perform filtering of packets based on a target ID of the data (namely group ID). More specifically, whether to forward received data to an upper layer or to discard the received data at the MAC layer is determined based on the target ID included in the MAC header for D2D data. However, in the case of a UE-to-network relay, filtering based on a target ID (or a destination ID) may not show off sufficient filtering operation. For example, suppose a UE performing a relay operation performs packet filtering based on the target ID (or destination ID). At this time, in order for a network to transmit the same data to a plurality of UEs connected to a relay UE, the network has to set the destination ID of each remote UE for the respective data, which leads to increase of the header and thereby reduces a data transfer efficiency.

In this regard, to solve the technical problem described above, the present invention additionally proposes a method for a relay UE to perform packet filtering based on a source ID (or destination ID). More specifically, for the convenience of description, the present invention is described with respect to a new packet filtering operation in terms of a relay, the operation supporting 1. a relay service related to one-to-many (1:M) data transmitted by a remote UE and 2. a relay service related to one-to-one (1:1) data transmitted by a remote UE. At this time, for the convenience of description, an embodiment of the present invention is described under an assumption that a remote UE transmits data, a relay UE receives the data and performs packet filtering on the received data, and forwards the data selectively. In other words, the fact that this document describes a method in which a relay UE performs packet filtering on the data transmitted by a remote UE and forwards the data selectively to a network does not exclude the method in which a relay UE performs packet filtering on the data transmitted by a network and transmits the data selectively to a remote UE from the technical scope of the present invention.

Figure 13:
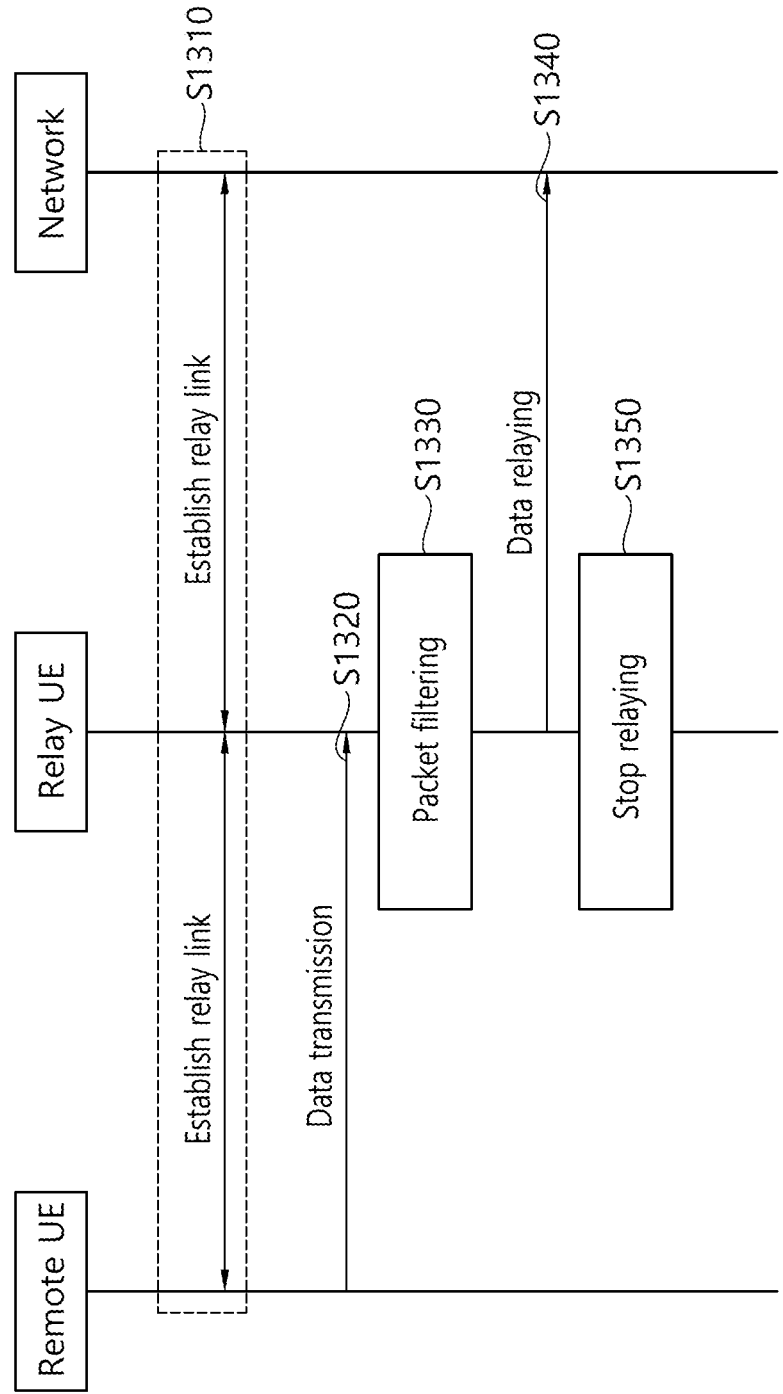
FIG. 13 is a flow diagram of a packet filtering method based on a source ID according to one embodiment of the present invention.

FIG. 13 is a flow diagram of a packet filtering method based on a source ID according to one embodiment of the present invention.

According to FIG. 13, a UE performing a relay operation establishes a relay link S1310. Here, a 'UE performing a relay operation' may be called collectively a 'relay UE', and in what follows, for the convenience of description, a 'UE performing a relay operation' and a 'relay UE' may be used interchangeably. At this time, a relay UE may refer to a UE that provides a relay service. Also, a UE that wants to receive a relay service may be called a 'remote UE'.

More specifically, a relay UE may establish a UE-to-Network relay link with a remote UE. In other words, a relay UE may establish a relay link between a remote UE-to-Network via a relay UE by establishing a relay link with a remote UE and a network.

A relay UE may request a network (for example, an eNB) to configure a data radio bearer to suit the purpose of a relay through an RRC connection establishment or Prose indication procedure, for example. A relay UE may inform a network of a source ID and a destination ID with respect to a relay.

A network requests the corresponding EPS (Evolved Packet System) bearer from an MME, and the MME may set the EPS bearer in the network. Also, a network may set a data radio bearer to a relay UE (and the network may selectively set a relay RNTI (Radio Network Temporary Identifier) with respect to a remote UE to the relay UE). If the data radio bearer is set, the RRC layer of the relay UE may set the data radio bearer to be established for lower layers together with a source ID.

When a relay UE establishes a relay link between the relay UE and a remote UE, 1. the relay UE may be configured to provide a relay service only for one-to-many (1:M, M is a predetermined natural number) data. Also, 2.

the relay UE may be configured to provide a relay service only for one-to-one data so that a relay link may be established between the relay UE and the remote UE. Also, 3. the relay UE may be configured to provide a relay service for all data so that a relay link may be established between the relay UE and the remote UE.

In what follows, provided will be detailed descriptions about cases in which a relay UE is configured to provide a relay service through a relay link established between the relay UE and the remote UE. At this time, the cases include: 1. a case in which the relay UE is configured to provide a relay service only for one-to-many (1:M, M is a natural number) data, namely a groupcast and/or broadcast relay service and 2. a case in which a relay UE is configured to provide a relay service only for one-to-one data, namely a unicast relay service.

Since the step in which the relay UE establishes a relay link S1310 is not an essential step of an embodiment of the present invention, the step in which a UE performing a relay operation establishes a relay link may be omitted in the embodiment of the present invention.

A remote UE transmits data to a relay UE S1320. A more specific embodiment in which a remote UE transmits data to a relay UE will be described later.

Afterwards, a relay UE performs packet filtering based on a source ID S1330. At this time, when the data received from lower layers are not forwarded to upper layers due to packet filtering of the relay UE, the data are discarded (namely filtered out).

More specifically, a relay UE performs packet filtering based on a source ID with respect to the data received from the S1320 step. At this time, the relay UE may perform filtering of the data so that the data may be forwarded to the upper layer only when the source ID of the data received by the relay UE coincides with the ID of a remote UE that the relay UE wants to receive.

A relay UE may distinguish 1. a UE-to-Network relay link configured to provide a one-to-many relay service with respect to the data transmitted by a remote UE from 2. A UE-to-Network relay link configured to provide a one-to-one relay service with respect to the data transmitted by the remote UE and perform packet filtering on the received data. Detailed descriptions about the aforementioned operation will be given later.

Afterwards, a relay UE relays the data to a network S1340. More specifically, a relay UE reports a buffer status to a network while a transfer buffer is filled with the relay data received from the remote UE. When the relay UE reports the buffer status, the relay UE may include information indicating that the buffer status report is related to the relay data in a Buffer Status Report (BSR) for Uu transmission. In other words, the relay UE may include information indicating that the buffer status report is related to relay data in the BSR.

When generating a BSR, the UE may include in the BSR information indicating that the BSR is related to the relay data between the UE and a network. To this purpose, the UE may inform the network that the buffer status report is intended for a relay between the UE and the network by including a separate indicator in the buffer status report or by including a predetermined, specific Logical Channel Group ID dedicated to a relay service or a specific Logical Channel ID in the buffer status report.

Along with the aforementioned operation or separately from the operation, a relay UE providing a relay service between the UE and a network may include a source ID of the relay data in the buffer status report. To this purpose, the relay UE may use a method of including a source ID in an existing buffer status report. Based on whether the buffer status report received from the relay UE includes a source ID, the eNB may determine whether the buffer status report is intended for a relay service between a UE and a network or intended for transmission of data that the relay UE generates itself. If a buffer status report is included in a buffer status report message for each Logical Channel Group ID or Logical Channel ID, the UE may include the source ID in the buffer status report information about the Logical Channel Group or Logical Channel designated by the UE for a relay service.

After receiving a buffer status report from a UE, the network may provide a grant for uplink transmission to a relay UE. This uplink grant may indicate a source ID or an ID associated with a source ID. For example, the uplink grant may indicate an RNTI for Uu interface mapped to the source ID. This procedure assumes that a relay UE monitors an RNTI mapped to a source ID included in the MAC header of the data received from a remote UE. In another method, when a network provides a grant for uplink transmission to a relay UE after receiving a buffer status report from the relay UE, the grant may indicate an RNTI for UE-to-Network relay preset to the relay UE. The procedure above assumes that a network sets a relay RNTI in advance to a relay UE, and the relay UE monitors the preset relay RNTI after reporting a buffer status for a relay.

Although not shown in the present figure, a case in which a relay UE relays the data received from a different relay UE to another UE, namely a UE-to-UE relay case is also included. In this case, in order to obtain a sidelink grant for transmitting the relay data to another UE, the relay UE performs sidelink buffer status report to a network. At this time, the sidelink buffer status report may include information indicating that the buffer status report is related to relay data. For example, the relay UE may inform the network that the buffer status report is related to UE-to-UE relay by including a separate indicator within the buffer status report or by including a predetermined, specific Logical Channel Group ID dedicated to a relay service or a specific Logical Channel ID in the buffer status report.

Along with the aforementioned operation or separately from the operation, a relay UE providing a UE-to-UE relay service may include a source ID of the relay data in the buffer status report. To this purpose, a relay UE may use a method which includes a source ID in the destination ID field within an existing sidelink buffer status report and indicates that the corresponding field contains the source ID or a method which include a source ID field in an existing sidelink buffer status report. An eNB may determine whether the buffer status report is related to a UE-to-UE relay service on the basis of whether a source ID is included in the buffer status report received from the relay UE. More specifically, an eNB may determine whether sidelink transmission to be performed by a relay UE is intended for a relay service or whether the sidelink transmission originates from the data that the relay UE itself has generated.

After receiving a buffer status report from a UE, the network may provide a grant for uplink transmission to a relay UE. This sidelink grant may indicate a source ID or an ID associated with a source ID. For example, the sidelink grant may indicate an RNTI for sidelink mapped to the source ID. This procedure assumes that a relay UE monitors an RNTI mapped to a source ID included in the MAC header of the data received from a remote UE. In another method, when a network provides a grant for sidelink transmission to a relay UE after receiving a buffer status report from the relay UE, the grant may indicate an RNTI for UE-to-UE relay preset to the relay UE. The procedure above assumes that a network sets a relay RNTI in advance to a relay UE, and the relay UE monitors the preset relay RNTI after reporting a buffer status for a relay.

Afterwards, the relay UE may stop relaying S1350. More specifically, when a plurality of UEs may relay the same source (for example, a case in which a first, second, and third UE operate as relay UEs, and all of the first, second, and third UE relay the data received from a fourth UE) or relaying a remote UE by a relay UE becomes inappropriate, the network may release a radio bearer from the relay UE. Also, for example, when the relay UE's relaying the remote UE becomes inappropriate, the relay UE may inform the network that a radio bearer should be released.

If the network determines to stop relaying of the relay UE, the network may release a radio bearer. And when a radio bearer with respect to the relay is released, the relay UE may release the radio bearer and stop relaying.

With respect to the embodiment of the present invention, L1 (namely the first layer) may perform filtering based on an L1 ID at SCI.

Figure 14:
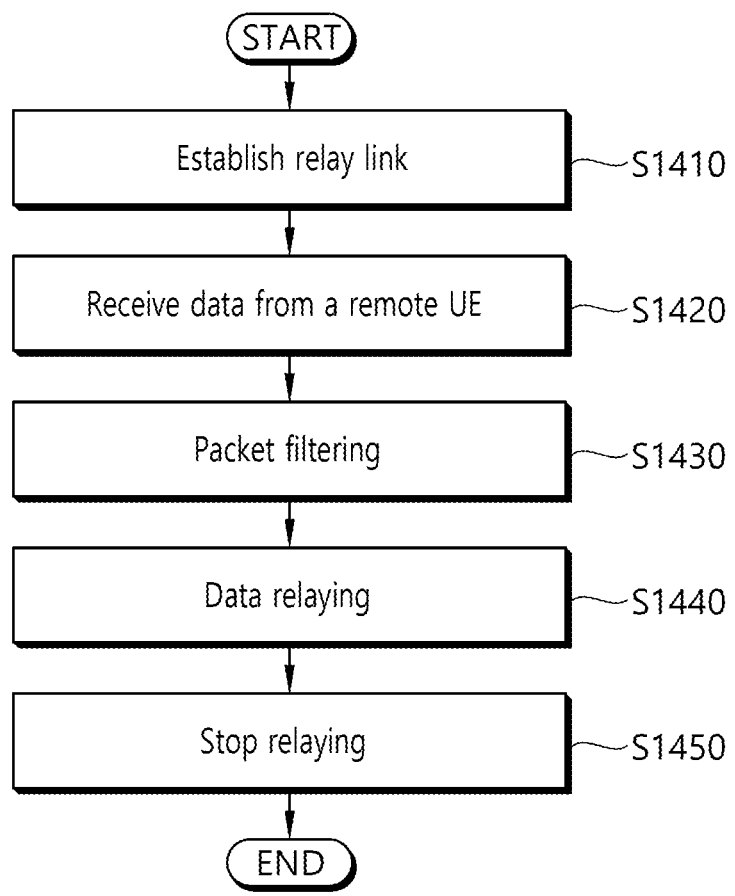
FIG. 14 is a flow diagram illustrating a packet filtering method based on a source ID according to another embodiment of the present invention.

FIG. 14 is a flow diagram illustrating a packet filtering method based on a source ID according to another embodiment of the present invention.

According to FIG. 14, a relay UE may establish a relay link S1410. As described above, when a relay link is established between a relay UE and a remote UE, 1. the relay UE is configured to provide a relay service only for one-to-many (1:M, M is a natural number) data, or 2. the relay UE is configured to provide a relay service only for one-to-one data, which will be described in more detail below.

A relay UE may receive data from a remote UE S1420. At this time, a specific example in which a relay UE receives data from a remote UE will be described below.

Afterwards, the relay UE performs packet filtering on the data by using a source ID S1430. As described above, the relay UE may distinguish 1. a UE-to-Network relay link configured to provide a one-to-many relay service with respect to the data transmitted by a remote UE from 2. A UE-to-Network relay link configured to provide a one-to-one relay service with respect to the data transmitted by the remote UE and perform packet filtering on the received data. Detailed descriptions about the aforementioned operation will be given later.

Afterwards, the relay UE may relay filtered data S1440. A specific example in which a relay UE relays data is as described above.

Now, if a condition for stopping relaying is satisfied, the relay UE may stop relaying S1450. At this time, a specific example in which a relay UE stops relaying is as described above.

In what follows, a specific example of performing packing filtering on received data will be described with reference to a related drawing. The description of the specific example distinguishes 1. a UE-to-network relay link configured to provide a one-to-many relay service with respect to the data transmitted by a remote UE from 2. a UE-to-network relay link configured to provide one-to-one relay service with respect to the data transmitted by a remote UE.

Figure 15:
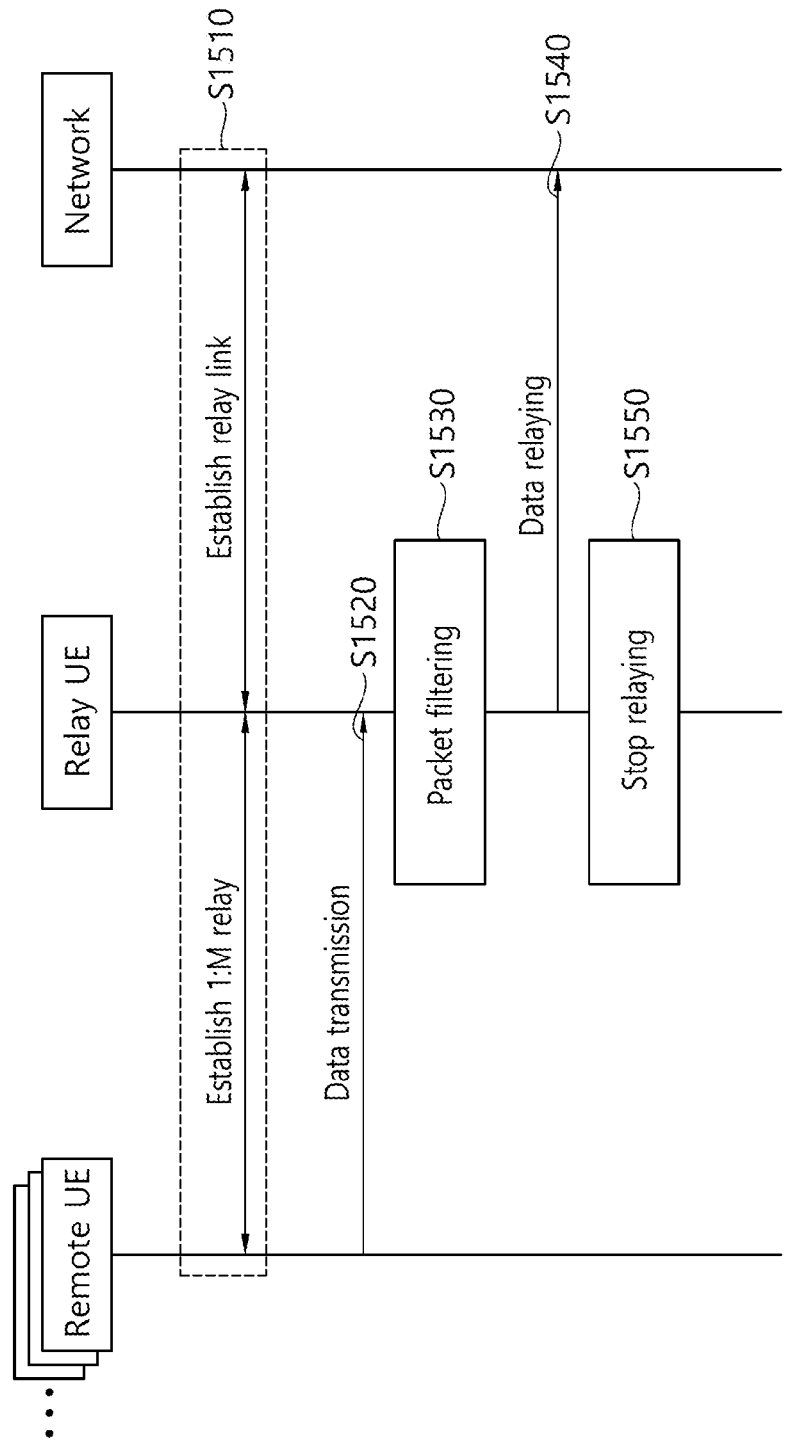
FIG. 15 is a flow diagram illustrating a packet filtering method in a one-to-many relay based on a source ID according to one embodiment of the present invention.

FIG. 15 is a flow diagram illustrating a packet filtering method in a one-to-many relay based on a source ID according to one embodiment of the present invention.

According to FIG. 15, a relay UE establishes a relay link S1510. At this time, a relay link established between the relay UE and a remote UE may be configured to provide a relay service about a one-to-many (1:M, M is a natural number) data service.

In this case, a relay UE may be provided together with a list of group IDs related to one-to-many transmission of the relay UE. At this time, the list of group IDs related to one-to-many transmission provided to the relay UE may be 1) a white list (where a white list may refer to a relay service providing data transmission to groups within a group list) or 2) a black list (where a black list may refer to a relay service providing data transmission to a group not belonging to a group list). At this time, the white list and the black list set to the relay UE are distinguished from the source ID and the destination ID of the data transmitted by the remote UE.

1) The case where a list of group IDs is a white list

If a white list is set to a relay UE, the relay UE may be regarded as being interested in relaying and receiving data transmitted by a remote UE with respect to a group ID belonging to a group list.

2) The case where a list of group IDs is a black list

If a black list is set to a relay UE, the relay UE may be regarded as being interested in relaying and receiving data transmitted by a remote UE with respect to group IDs except for all the group IDs belonging to a group list (namely group IDs except for those belonging to the black list).

Even when a one-to-many relay link is established, as described above, the relay UE may request a network (for example, eNB) to configure a data radio bearer for the purpose of relay. The relay UE may also inform the network associated with the relay of a source ID and a destination ID. The network requests the corresponding EPS (Evolved Packet System) bearer from an MME, and the MME may set the EPS bearer in the network. Also, a network may set a data radio bearer to a relay UE. If the data radio bearer is set, the RRC layer of the relay UE may set the data radio bearer to be established for lower layers together with a source ID.

Also, since the step of establishing a one-to-many relay link is not an essential step of the present embodiment, the step of establishing a one-to-many relay link may be omitted from the present embodiment.

A remote UE may transmit data to the relay UE, namely the relay UE may receive data from the remote UE S1520. More specifically, at this time, the ID of the remote UE which has transmitted the data may be set as a source ID in the data, and the ID of a destination to which the remote UE attempts to transmit the data may be set as a destination ID. Also, in the data transmitted by the remote UE, the L2 destination ID (L2 D-ID) of the data may be set as an L2 group ID to which the remote UE attempts to transmit data.

Afterwards, the relay UE performs packet filtering based on a source ID S1530. More specifically, first, the relay UE determines whether the source ID of received data corresponds to the ID of the remote UE to which the relay UE attempts to relay the received data. If the source ID of the data received by the relay UE is found to correspond to the ID of the remote UE to which the relay UE attempts to relay the received data, packet filtering is performed on the basis of the following additional determination.

If a relay link is configured to provide a one-to-many data relay service with respect to the data transmitted by the remote UE, and the relay UE receives data from the remote UE, namely the ID indicating the remote UE (for example, the L2 UE ID of the remote IE) belonging to the L2 source ID part (for example, MAC header) of the data, the relay UE performs packet filtering according to the 1) white list or 2) black list.

1) The case where white list group IDs are set to a relay UE

If the L2 destination ID field included in the data received by the relay UE matches whichever entry in the white list group IDs, and the corresponding data radio bearer is configured with respect to relaying on the Uu interface, the relay UE may forward the PDU part of the received data to upper layers.

For example, suppose a white list includes a first ID, a second ID, and a third ID, and the data received by a relay UE is configured to have the first ID as a destination ID. Under this assumption, since the destination ID of the data received by the relay UE (namely the first ID) coincides with the ID (the first ID) in the white list set to the relay UE (namely the first, the second, and the third ID), the relay UE may forward the PDU part of the data received by the relay UE to the upper layer.

If the L2 destination ID field included in the data does not match any entry of white list group IDs, or if the corresponding data radio bearer with respect to relaying on the Uu interface is not configured, the relay UE may allow the upper layer to discard the PDU part of the received data.

For example, suppose a white list includes a first ID, a second ID, and a third ID, and the data received by the relay UE is configured to have a fourth ID as a destination ID. Under this assumption, since the destination ID of the data received by the relay UE (namely the fourth ID) does not coincide with any ID among the IDs belonging to the white list set to the relay UE (namely the first, the second, and the third ID), the relay UE may not forward the PDU part of the received data to the upper layer.

2) The case where black list group IDs are set to a relay UE

If the L2 destination ID field included in the data does not match any entry of black list group IDs, and the corresponding data radio bearer is configured with respect to relaying on the Uu interface, the relay UE may forward the PDU part of the received data to upper layers.

For example, suppose a black list includes a first ID, a second ID, and a third ID, and the data received by the relay UE is configured to have a fourth ID as a destination ID. Under this assumption, since the destination ID of the data received by the relay UE (namely the fourth ID) does not coincide with any ID among the IDs belonging to the black list set to the relay UE (namely the first, the second, and the third ID), the relay UE may forward the PDU part of the received data to the upper layer.

If the L2 destination ID field included in the data does not match any entry of black list group IDs, or if the corresponding data radio bearer with respect to relaying on the Uu interface is not configured, the relay UE may allow the upper layer to discard the PDU part of the received data.

For example, suppose a black list includes a first ID, a second ID, and a third ID, and the data received by the relay UE is configured to have a fourth ID as a destination ID. Under this assumption, since the destination ID of the data received by the relay UE (namely the fourth ID) coincides with an ID (first ID) among the IDs belonging to the black list set to the relay UE (namely the first, the second, and the third ID), the relay UE may not forward the PDU part of the received data to the upper layer.

At this time, when the data received from lower layers are not forwarded to upper layers due to packet filtering of the relay UE, the data are discarded (namely filtered out).

Afterwards, the relay UE relays data to the network S1540. At this time, detailed descriptions about how the relay UE relays data are the same as described above.

Afterwards, if a condition for stopping relaying is satisfied, the relay UE may stop relaying S1550. At this time, detailed descriptions about how a relay UE stops relaying are the same as described above.

Figure 16:
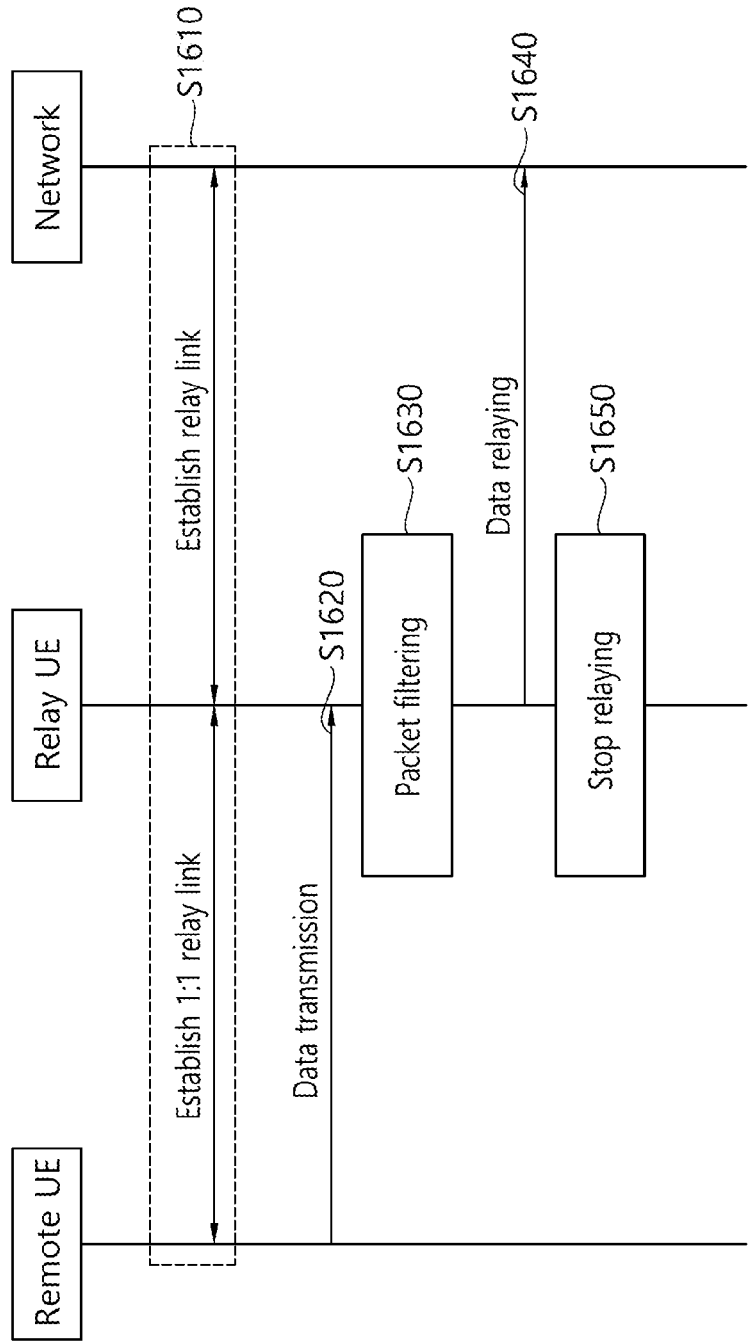
FIG. 16 is a flow diagram illustrating a packet filtering method in a one-to-one relay based on a source ID according to one embodiment of the present invention.

FIG. 16 is a flow diagram illustrating a packet filtering method in a one-to-one relay based on a source ID according to one embodiment of the present invention.

According to FIG. 16, a relay UE establishes a relay link S1610. At this time, a relay link established between the relay UE and a remote UE may be configured to provide a relay service about a one-to-one data service.

A relay UE may be configured to relay all of one-to-one data transmitted from a remote UE and at this time, the one-to-one data may include data directed to the relay UE and other UEs. Here, the fact that the one-to-one data include data directed to not only the relay UE but also other UEs indicates that the relay UE does not unconditionally forward In this case, a relay UE may consider the UE ID of a remote UE as a source ID for packet filtering. And the relay UE may be regarded as being interested in receiving and relaying data in which an ID of the remote UE is transmitted by the remote UE. Therefore, when the relay UE receives data, if a source ID of the data is set to the source ID of the remote UE, the relay UE may relay received data.

For example, when the relay UE knows the source ID of the remote UE, if data having a first source ID, data having a second source ID, and data having a source ID of the remote UE are received, the relay UE may relay only the data having a source ID of the remote UE.

A relay UE may be configured to relay one-to-one data transmitted only to the relay UE itself.

In this case, the relay UE may consider the UE ID of a remote UE as a source ID and the UE ID of the relay UE as a destination ID for packet filtering. Therefore, if the source ID of the remote UE is set for the source ID of data, and the UE ID of the relay UE is set for the destination ID of the data, the relay UE may relay received data.

Even when a one-to-one relay link is established, as described above, the relay UE may request a network (for example, eNB) to configure a data radio bearer for the purpose of relay. The relay UE may also inform the network associated with the relay of a source ID and a destination ID. The network requests the corresponding EPS (Evolved Packet System) bearer from an MME, and the MME may set the EPS bearer in the network. Also, a network may set a data radio bearer to a relay UE. If the data radio bearer is set, the RRC layer of the relay UE may set the data radio bearer to be established for lower layers together with a source ID.

Also, since the step of establishing a one-to-one relay link is not an essential step of the present embodiment, the step of establishing a one-to-one relay link may be omitted from the present embodiment.

A remote UE may transmit data to the relay UE, namely the relay UE may receive data from the remote UE S1620. More specifically, a remote UE may transmit data, and, in the data transmitted by the remote UE, the L2 destination ID (L2 D-ID) of the data may be set as an L2 UE ID of the relay UE providing a relay service.

At this time, the ID space for a UE ID may be different from the ID space for a group ID. At this time, by using the knowledge of an ID space split, a receiving UE may determine whether the data needs to be directed to a single UE or a group of UEs on the basis of the ID received from the destination ID field.

At this time, the ID space may be shared with a UE ID and/or group ID. At this time, a data transmitting UE needs to make sure for each packet whether the data are transmitted to a correct UE or a correct group of UEs.

Afterwards, a relay UE performs packet filtering based on a source ID S1630. More specifically, the case in which a relay link is configured to provide a one-to-one relay service with respect to the data transmitted by a remote UE may be described with a specific example given below.

1) The case where the MAC of a relay UE receives data from a remote UE. In other words, the case where the ID indicating a remote UE (L2 UE ID of a remote UE) is included in the L2 source ID part (for example, MAC header) of the data.

The MAC of a UE may forward the PDU part of received data to the upper layer (when the corresponding data radio bearer is configured with respect to relaying on the Uu interface).

To put it differently, the relay UE checks the source ID of the received data, and if the source ID of the received data corresponds to the ID of a remote UE to which the relay UE attempts to forward the received data, the relay UE forwards the PDU part of the received data to the upper layer.

2) The case where the MAC of a relay UE receives data from a remote UE selectively, namely the case where the ID indicating a remote UE (L2 UE ID of a remote UE) is include in the L2 source ID part (for example, MAC header) of the data.

When the ID included in the L2 destination ID of the received data is the same as the L2 ID of a relay UE, and the corresponding data radio bearer is configured with respect to relaying on the Uu interface, the MAC of a UE may forward the PDU part of received data to the upper layer.

In other words, as described above, the relay UE checks not only the source ID of the received data but also the destination ID of the received data, and only when the source ID of the data received by the relay UE corresponds to the ID of the remote UE, and the destination ID of the data received by the relay UE corresponds to the ID of the relay UE, the relay UE forwards the PDU part of the received data to the upper part.

At this time, when the data received from lower layers are not forwarded to upper layers due to packet filtering of the relay UE, the data are discarded (namely filtered out).

Afterwards, the relay UE relays data to the network S1640. At this time, detailed descriptions about how the relay UE relays data are the same as described above.

Afterwards, if a condition for stopping relaying is satisfied, the relay UE may stop relaying S1650. At this time, detailed descriptions about how a relay UE stops relaying are the same as described above.

Figure 17:
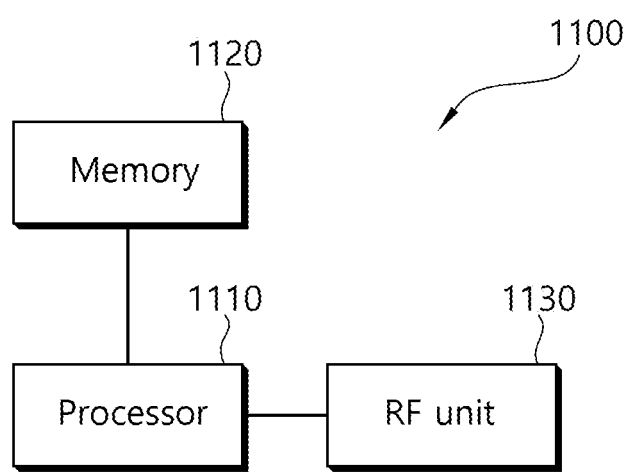
FIG. 17 is a block diagram illustrating a UE in which an embodiment of the present invention is implemented.

FIG. 17 is a block diagram illustrating a UE in which an embodiment of the present invention is implemented.

Referring to FIG. 17, a UE 1100 comprises a processor 1110, a memory 1120, and an RF (Radio Frequency) unit 1130. The processor 1110 implements proposed function, processes, and/or methods. For example, the processor 1110 may establish a relay link through the RF unit 1130.

Also, the processor 1110 may transmit data to a relay UE.

Also, the processor 1110 may perform packet filtering based on a source ID.

Also, the processor 1110 may relay the data to a network.

Also, the processor 1110 may stop relaying.

The RF unit 1130, being connected to the processor 1110, transmits and receives a radio signal.

The processor may include ASIC (Application-Specific Integrated Circuit), other chipsets, logical circuits and/or data processing devices. The memory may include ROM (Read-Only Memory), RAM (Random Access Memory), flash memory, memory card, storage medium and/or other storage devices. The RF unit may include a baseband circuit for processing a radio signal. When an embodiment is implemented in software, the methods described above may be implemented by modules (processes or functions) performing the functions described above. A module may be stored in the memory and executed by the processor. The memory may be installed inside or outside the processor and may be connected to the processor through various well-known means.

What is claimed is:

1. A method for filtering data in a wireless communication system, the method being performed by a relay user equipment (UE) and comprising:
receiving, from a remote UE, the data including a source ID of the data;
filtering the data; and
relaying the filtered data,
wherein the data is filtered based on a source ID of the data,
wherein, when the filtered data is relayed, the relay UE transmits the filtered data and a buffer status report (BSR) to a base station,
wherein the BSR includes information informing the base station that the filtered data is relayed data,
wherein the relay UE receives a grant for an uplink transmission from the base station after transmitting the BSR, and
wherein the grant for the uplink transmission is a grant related to a radio network temporary identifier (RNTI) for a Uu interface mapped to the source ID.

2. The method of claim 1, further comprising:
establishing a relay link between the network base station and the remote UE,
wherein the data is transmitted through the relay link.

3. The method of claim 2, wherein:
the relay link is a relay link providing a relay service between the relay UE and M remote UEs; and
M is a natural number equal to or larger than 2.

4. The method of claim 3, wherein, when the relay link is established, a white list is allocated to the relay UE, the white list informing that data is transmitted to UEs related with a group ID belonging to a group list.

5. The method of claim 4, wherein:
the relay UE determines whether a source ID of the data, related with an ID of the remote UE, and a destination ID of the data corresponds to a group ID of the white list; and
the relay UE relays data when the source ID is related with an ID of the remote UE and the destination ID is related with a group ID of the white list.

6. The method of claim 3, wherein, when the relay link is established, a black list is allocated to the relay UE, the black list informing that data are not transmitted to UEs corresponding to a group ID belonging to a group list.

7. The method of claim 6, wherein:
the relay UE determines whether a source ID of the data, related with an ID of the remote UE, and a destination ID of the data corresponds to a group ID of the black list; and
the relay UE relays data when the source ID is related with an ID of the remote UE and the destination ID is related with a group ID of the black list.

8. The method of claim 2, wherein the relay link is a relay link providing a relay service between a relay UE and a remote UE.

9. The method of claim 2, wherein, when the relay link is established, the base station is requested to configure a data radio bearer with respect to relaying.

10. The method of claim 1, wherein, when a relaying stopping condition is met, relaying the filtered data is stopped.

11. A user equipment (UE), comprising:
- a Radio Frequency (RF) unit transmitting and receiving a radio signal; and
- a processor operatively connected to the RF unit, the processor being configured to:
  - receive, from a remote UE, data including a source ID of the data;
  - filter the data; and
  - relay the filtered data,
  - wherein the data is filtered based on a source ID of the data,
  - wherein, when the filtered data is relayed, the relay UE transmits the filtered data and a buffer status report (BSR) to a base station,
  - wherein the BSR includes information informing the base station that the filtered data is relayed data,
  - wherein the relay UE receives a grant for an uplink transmission from the base station after transmitting the BSR, and
  - wherein the grant for the uplink transmission is a grant related to a radio network temporary identifier (RNTI) for a Uu interface mapped to the source ID.

* * * * *